United States Patent [19]

Wood, III

[11] Patent Number: 5,005,452
[45] Date of Patent: Apr. 9, 1991

[54] HIGH PRODUCTION MACHINING DEVICE

[75] Inventor: David B. Wood, III, Mason, Ohio

[73] Assignee: Cincinnati Milacron Inc., Cincinnati, Ohio

[21] Appl. No.: 391,929

[22] Filed: Aug. 10, 1989

[51] Int. Cl.$^5$ ............................................. B23B 00/00
[52] U.S. Cl. ...................................... 82/132; 82/133; 82/137; 82/138; 82/141
[58] Field of Search ................. 82/124, 129, 132, 133, 82/134, 135, 136, 137, 138, 139, 140, 141, 118; 29/36

[56] References Cited

U.S. PATENT DOCUMENTS

| | | | |
|---|---|---|---|
| 2,627,196 | 2/1953 | Marsilius | 82/138 |
| 3,347,116 | 10/1967 | Anderson | 82/141 |
| 3,393,588 | 7/1968 | Broome | 82/2 |
| 3,635,109 | 1/1972 | Jacobson | 82/2 D |
| 3,672,246 | 6/1972 | Prewett, Jr. et al. | 82/2 B |
| 3,937,110 | 2/1976 | Renoux | 82/138 |
| 4,008,635 | 2/1977 | Gilbert et al. | 82/30 |
| 4,159,660 | 7/1979 | Buckley | 82/129 |
| 4,165,661 | 8/1979 | Wasco, Jr. et al. | 82/2 |
| 4,197,769 | 4/1980 | Smith | 82/129 |
| 4,669,359 | 6/1987 | Shiba | 82/141 |
| 4,719,676 | 1/1988 | Sansone | 82/129 |
| 4,738,171 | 4/1988 | Link et al. | 82/2.5 |
| 4,763,549 | 8/1988 | Hata et al. | 82/2.5 |
| 4,771,662 | 9/1988 | Eichenhofer et al. | 82/3 |
| 4,813,311 | 3/1989 | Hebbruggen | 82/132 |
| 4,813,315 | 4/1989 | Takahashi | 82/142 |

FOREIGN PATENT DOCUMENTS 2121713 1/1984 United Kingdom .

Primary Examiner—Frederick R. Schmidt
Assistant Examiner—Blynn Shideler
Attorney, Agent, or Firm—Frost & Jacobs

[57] ABSTRACT

There is provided a high-production machining device having first and second spindles rotatably mounted on a headstock. A carriage is slidably mounted on the machine bed, and in a preferred embodiment a first drive assembly is provided for sliding the carriage across the upper face of the bed along a transverse axis thereof. First and second slides are slidably mounted on the carriage for movement in a direction normal to the transverse axis, with the first and second slides each adapted to carry a machine tool and each being attached to a common second drive assembly for moving the slides in that normal direction. A linear sensor monitors the positions of the first and second slides relative one another, and an independent compensating assembly is provided for adjusting the position of one of the slides relative the other in the normal direction, whereby positions of the first and second slides in the normal direction can be effectively independently controlled. In a preferred embodiment, the machining device further includes an independent adjustment device for moving one of the spindles relative the other in a direction parallel to the transverse axis, whereby the positions of the first and second slides in the transverse direction can be effectively independently controlled.

20 Claims, 6 Drawing Sheets

HIGH PRODUCTION MACHINING DEVICE

TECHNICAL FIELD

This invention relates to a high-productivity, twin-spindle turning center featuring a built-in compensation system to correct for processing errors, and, more particularly, to an improved two-spindle machining device having a built-in tool compensation system which provides for individual process control for each spindle.

BACKGROUND ART

Machine tools having automatic control mechanisms for supervision of turning operations are widely used in the industry in conventional lathe machines and the like. Today's industry reflects an ever-increasing criticality for compensation systems for minimizing relatively small, but significant, errors in the position of the workpiece relative the machining tool being applied to that workpiece. Moreover, in multi-spindle lathe applications, it is critical to maintain several machining tools in precise position relative to respective workpieces in order to maintain all parts produced within increasingly close tolerances.

In an effort to enhance productivity while minimizing required core space, multi-spindle lathe machines have replaced single-spindle machines in many high production environments. However, in applications where twin-spindle, two-axis machines are utilized to increase productivity of a particular part, it is imperative that full production be maintained on both spindles in order to justify the significantly higher costs of the two-spindle machines versus the single-spindle machines. The program controlling the movements of the tooling relative the workpieces along the two axes of movement heretofore required that the tools be manipulated simultaneously, necessarily relying on the assumption that identical program motions will produce identical parts. In this regard, it was often required to "qualify" a corresponding pair of tools to assure the identity of their critical dimensions. Unfortunately, however, even identical tools may not perform identically in the machine environment, as a result of idiosyncrasies of the machine itself, differing deflections in use, different wear patterns, and the like.

Heretofore, the industry has attempted to address the problems of these inherent errors by measuring resulting parts and assigning offset errors which can be compensated for by providing adjustable tool blocks, or by undertaking tedious shimming operations of the tools themselves. Often a machinist had no other choice but to average the errors between the two tools, and attempt to adjust the tools and/or tool blocks to compensate. Once these initial errors were reduced sufficiently as a result of such labor-intensive adjustment procedures, it was often necessary to slow the turning process down to preserve tool life and, thereby, delay the tedious process of replacing worn tools as long as possible. Such compromise directly undermined productivity levels, and the process of averaging errors does not generally yield part accuracies which are competitive with the quality of parts made on single-spindle machines, let alone achieving the higher level of accuracy demanded in this industry.

For many years, it has also been recognized that the machining environment can also negatively affect the accuracy of machine tools, such as the effects of temperature on various parts of the machine. Growth of various parts such as spindles, drive screws, and the like can result in significant machine error which limits the accuracy and repeatability of the machine tool. The relatively high temperatures generally concomitant with the machining process causes expansion or "growth" of spindles and the various drives, which causes the components to expand and can result in a change in position of the tool relative the workpiece. This expansion probably occurs over an extended period of time so that the entire error would not be generated and cannot be determined in any single part. The cumulative error which can result from varying tool wear, differences in the tools themselves, and the effects of temperature changes can easily result in an error in the position of the workpiece relative the tool on any particular spindle, which is intolerable in most of today's precision machining operations. In such a case, even if one spindle is producing parts within the tolerance levels required, the substantial premium costs of a two-spindle machine cannot be justified where both spindles are not producing at satisfactory levels.

In the past, those in the industry have attempted to minimize the errors caused by temperature variations by warming the lathe machine up to its "running" temperature before initial offsets are established, and, thereafter running the machine continuously to maintain this stabilized temperature. Another similar approach was to operate the machine continuously to supposedly maintain a constant temperature at all times. It should be noted, however, that stabilization of a lathe may take hours, and assumes that conditions affecting the temperature of the machine will remain substantially constant. In fact, machines may not have a "stabilization" temperature, and oftentimes shutdowns of the machine cannot be avoided. During such a shutdown, the temperature would most likely change. Others have attempted to cool various parts of the machine tool in order to maintain a constant temperature, such as done in a water cooled combustion engine. The cooling systems, however, require additional design features to accommodate the fluid or air necessary for cooling, and would have many of the deficiencies of the other attempts to maintain the machine at a stabilized temperature.

One attempt to provide a compensating system for spindle growth in lathe machine is set forth in U.S. Pat. No. 3,393,588, which issued to F. Broome on July 23, 1968. The Broome reference contemplates a spindle which is movable along a Y-axis of the lathe to adjust the position of a workpiece carried by the spindle relative a cutting tool. The spindle is moved by means of a lead screw, and contemplates the use of a phase detector to feed back the position along the Y-axis from a resolver. A hydraulic motor responds to the error voltage generated by the detector and drives the lead screw to reduce that error. The phase detector thereby puts out an error signal to command the restoration of the spindle to its original position. Broome teaches that expansion of the spindle causes displacement between the chuck and the housing of the spindle, and compensation of that displacement acts to keep the chuck in its original Y position.

The Broome capacitance-gauge arrangement for sensing spindle growth is discussed in U.S. Pat. No. 3,672,246, which issued to H. Prewett, Jr. et al. on June 27, 1972. In particular, Prewett et al. state that the capacitance-type gauge does not always provide a continuously accurate measurement as a result of the relatively hostile environment within a lathe machine. To address the inaccuracies encountered with the Broome compensation device, Prewett et al. describe a device for monitoring a gap between a stationary air jet nozzle and a reference surface on the spindle. In particular, the stationary air jet nozzle detects spindle growth by monitoring the back pressure of the nozzle and converting that input to an electrical signal which is summed with conventional machine control unit carriage position error signal equipment to command an adjustment in the slide offset. It should be noted, however, that the Prewett arrangement is also subject to many of the same inaccuracies of the hostile environment as was Broome, and further requires a relatively cumbersome conglomeration of parts, including an air nozzle, a machined reference surface, air gauges, compressor equipment, valves, air lines, amplifiers, filters, and the like.

Finally, others in the industry have attempted to add on various compensators to the tool block itself, such as mounting one or more of the tool blocks on a separate slide solelY for compensating for small errors. It has been generally found that such add-on compensators do not work well as they are not dependable. Not only do these add-on compensators add greatly to the cost of the machine, but their components are generally smaller, and less able to cope with the harsh environment within a lathe machine. It is this same hostile (i.e., high temperature, messy, laden with machine oil, shavings, and dust) which limits the effectiveness and applications for other error-sensing and feedback mechanisms such as an etched scale and optical reading head often used to monitor growth or contraction of machine parts.

Consequently, heretofore, there has not been available a reliable, low-cost, built-in tool compensating system for lathe machines. Moreover, compensation systems previously available could not effectively provide a multi-spindle machine tool wherein individual process control for each spindle was possible. While multi-spindle machines have been available for quite some time, there has not been presented a compensation system which can consistently maintain high production rates on each spindle in a relatively simple and efficient manner.

DISCLOSURE OF THE INVENTION

It is an object of this invention to overcome the above-described problems and shortcomings of the compensating equipment heretofore available in the industry.

It is another object of the present invention to provide a built-in compensating system for multi-spindle machine tools which provides for individual process control for each spindle.

It is yet another object of the present invention to provide a high-production machining device having a plurality of spindles, wherein individual process control for each spindle is enabled, and wherein non-qualified tool blocks can be easily used and replaced.

It is also an object of the present invention to provide a high-production machining device which includes a built-in compensation system for correcting positioning errors between its spindles and its tool blocks in order to maximize the efficiency and productivity thereof.

In accordance with one aspect of the present invention, there is provided a high-production machining device having a machine bed, a headstock mounted on the bed, and first and second spindles rotatably mounted on the headstock. A carriage is slidably mounted on the machine bed, and a first drive assembly is provided for sliding the carriage across the upper face of the bed along a transverse axis thereof. First and second slides are slidably mounted on the carriage for movement in a direction normal to the transverse axis, with the first and second slides each adapted to carry a machine tool and each being attached to a common second drive assembly for moving the slides in that normal direction. A linear sensing device monitors the positions of the first and second slides relative one another, and an independent compensating assembly is provided for adjusting the position of one of the slides relative the other in the normal direction, whereby positions of the first and second slides in the normal direction can be effectively independently controlled. In a preferred embodiment, the machining device further includes independent adjustment means for moving one of the spindles relative the other in a direction parallel to the transverse axis, whereby the positions of the first and second slides in the transverse direction can be effectively independently controlled.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 3:
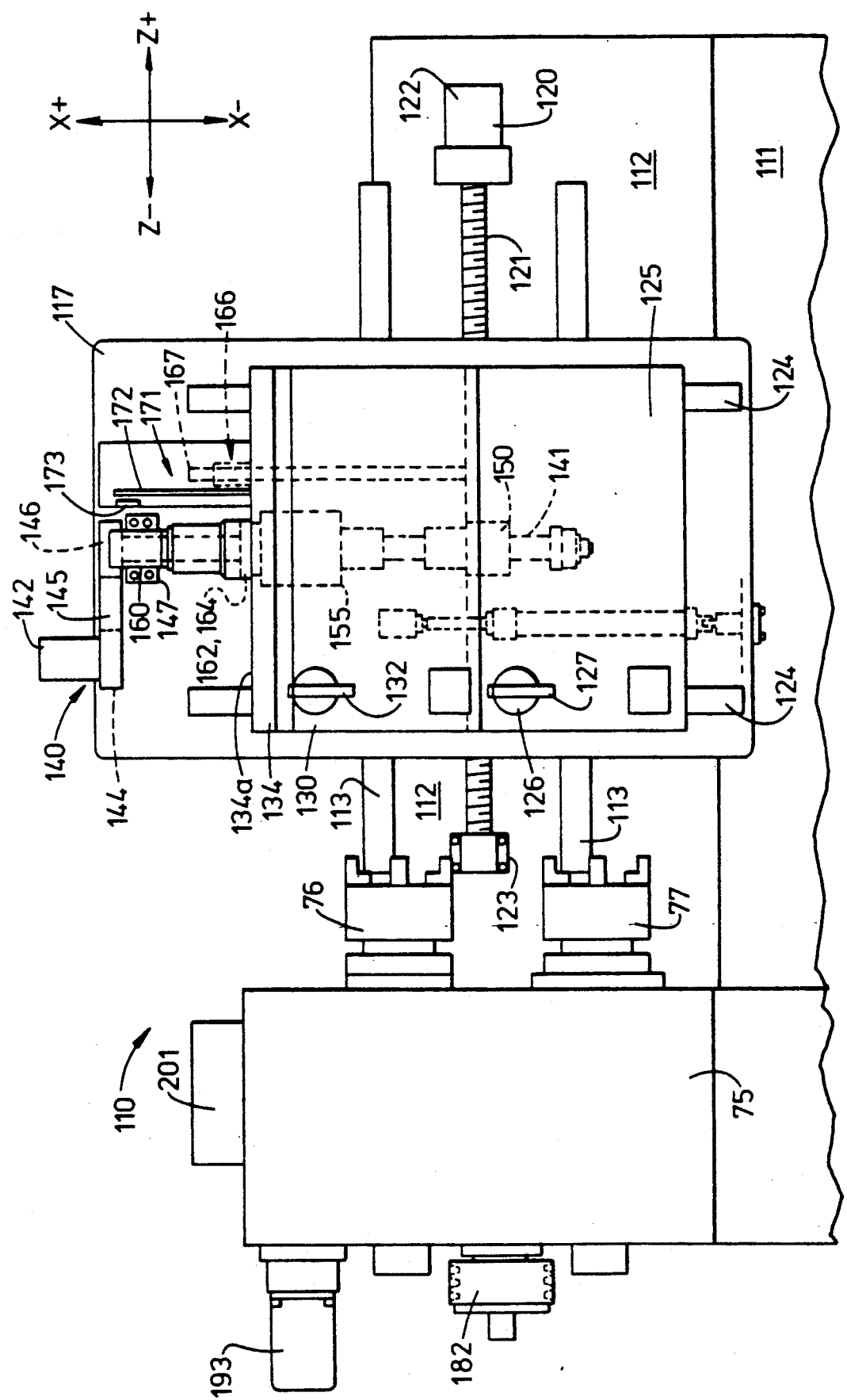
FIG. 3 is a partial front elevational view of a preferred embodiment of the high production machining device of the subject invention.

Referring now to the drawings in detail, like numerals indicate the same elements throughout the views, and corresponding elements from the schematic views and the views of the preferred embodiment can be identified by the last two digits of the element number. For example, FIG. 1 illustrates a schematic view of a high production machining device 10, whereas FIG. 3 illustrates a front elevational view of a preferred embodiment of a high production machining device 110.

Figure 1:
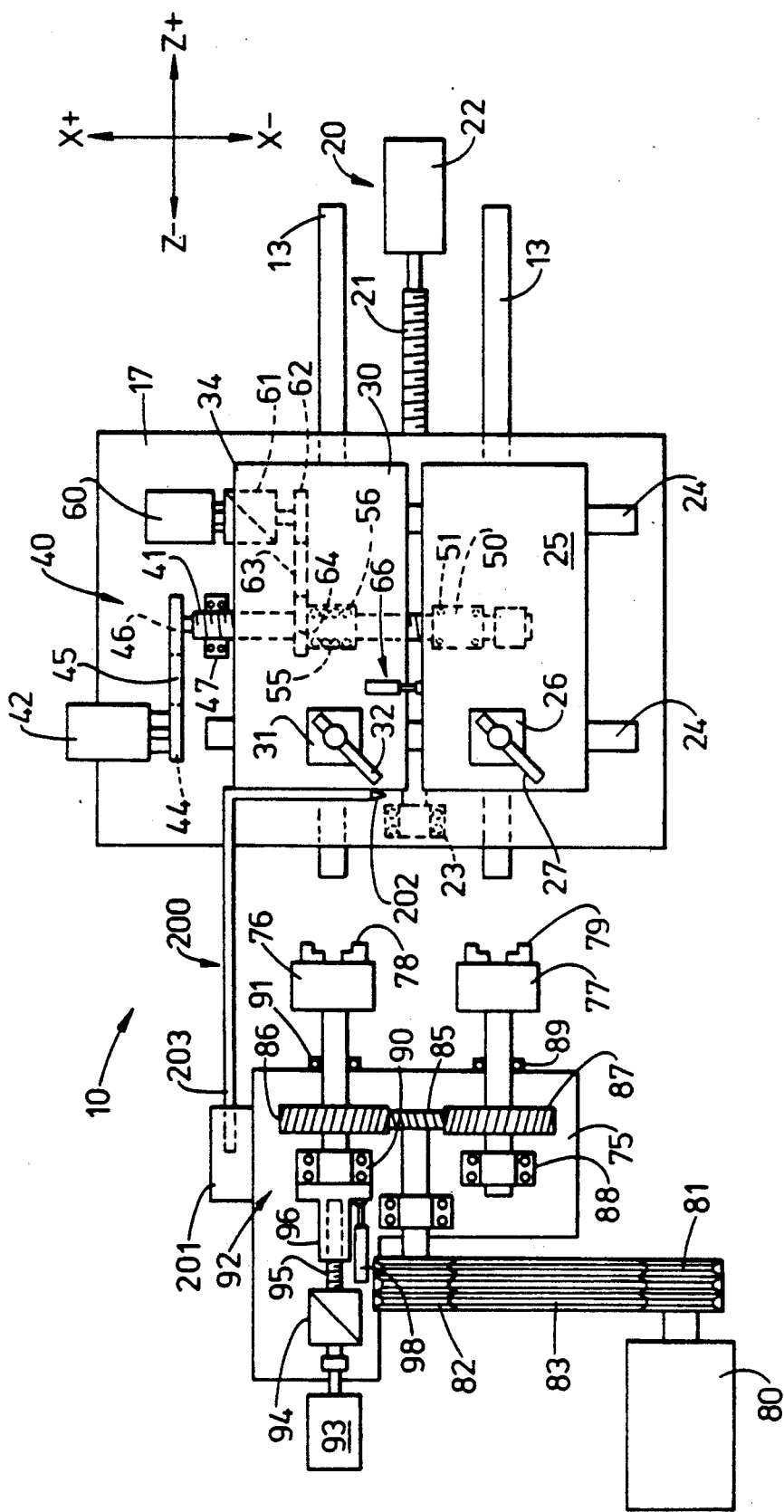
FIG. 1 is a schematic representation of the high production machining device of the subject invention.

FIG. 1 illustrates a simplified schematic layout of a high production machining device made in accordance with the present invention. In particular, a two-spindle lathe 10 is portrayed as including a carriage 17 slidably mounted on bedways 13 for movement along a transverse axis, identified as the Z-axis. It is contemplated that carriage 17 can be driven along ways 13 by a conventional carriage drive assembly (e.g. first drive assembly 20). Carriage drive assembly 20 is illustrated as including a carriage drive screw 21 mounted in thrust bearings 23 and rotated by Z-axis servo motor 22. Further details of this drive system are omitted as the same is well known in the industry.

Carriage 17 similarly includes a pair of parallel carriage ways 24 which are oriented normal to the Z-axis along an axis identified as the X-axis. Slidably mounted on carriage ways 24 are first or lower slide 25 and second or upper slide 30. A space is shown between lower slide 25 and upper slide 30 merely to emphasize that these two slides are independent of one another, and are not fixedly attached, as will be described more fully below. First slide 25 is shown as including tooling block 26 and tool 27, while second slide 30 is similarly illustrated as supporting tooling block 31 and tool 32 thereon. Tooling blocks 26 and 31 can preferably support gang tooling to provide for minimum cycle time during the production operations Slides 25 and 30 are slidably movable along carriage ways 24, and a second drive or slide drive assembly 40 is provided to accomplish this task. As indicated, slide drive assembly 40 includes a slide drive screw 41 mounted on the upper surface of carriage 17, preferably below slides 25 and 30. Screw 41 is mounted in thrust bearings 47 for rotation about the X-axis, and is driven by X-axis servo motor 42, such as through pulley/drive gear 44, belt 45 and driven pulley/gear 46. Lower slide ballscrew or similar antifriction nut 50 is mounted on screw 41 and non-rotatably attached to lower slide 25, such as by a plurality of bolts 51. Rotational movement of screw 41 is thereby converted to linear movement of lower slide 25 along the X-axis through nut 50.

Upper slide ballscrew or similar antifriction nut 55 is rotatably attached to upper slide 30. An independent compensating servo motor 60 is mounted on upper slide 30 and is connected directly to upper slide ballscrew nut 55 via pulley/gear 62, belt 63, and compensator driven gear/pulley 64. Compensator drive gear 64 is rigidly attached to ballscrew nut 55 such that rotation of ballscrew nut 55 can be controlled by compensating servo motor 60. It is preferred that a harmonic drive or speed-reducing unit 61 be included in the drive train between compensating servo motor 60 and ballscrew nut 55 to facilitate enhanced rotational control of ballscrew nut 55 and, hence, the linear sliding movement of upper slide 30. It will be understood that the combination of the independent compensating servo motor 60 and rotatable screw 41 driven by X-axis servo motor 42 together determine the resulting linear movement of second slide 30 along the X-axis. Consequently, while both lower slide 25 and upper slide 30 are attached to a common slide drive assembly 40 (i.e. screw 41), it will be seen that the rotatable connection of ballscrew nut 55 and its integrally-connected drive gear 64 and compensating servo motor 60 provides a means for effectively independently controlling the relative positions of lower slide 25 and upper slide 30 along the X-axis. A linear displacement feedback means 66 is schematically illustrated as means for monitoring the positions of first slide 25 and second slide 30 relative one another, as will be described in greater detail below.

Headstock 75 is shown as including a first or upper spindle 76 and a lower or second spindle 77 mounted parallel to one another and extending axially parallel to the transverse or Z-axis. Spindles 76 and 77 include work piece holders/chucks 78 and 79, respectively, and are illustrated as being driven by a single main spindle motor 80. Motor 80 transmits rotational input through drive pulley 81, belts 83 and driven pulley 82, and through the intermeshing gears 85, 86, and 87, respectively. Spindles 76 and 77 are shown as being journaled for rotation within bearings such as indicated at 88, 89, 90 and 91, and spindle 76 is mounted for rotation and axial movement along a path parallel to the Z-axis by quill 92. Axial movement of spindle 76 is independently provided by spindle compensation servo motor 93, which applies rotational input through harmonic drive or speed-reducing drive 94 to spindle compensating drive screw 95. Again, a harmonic drive (e.g. 160/1) is preferred to facilitate the application of highly controlled corrections to the axial position of spindle 76 and its work piece holder 78. Rotation of drive screw 95 transmits rotational input into linear movement through spindle compensator nut 96 and quill 92. As described above with regard to the independent adjustability of slides 25 and 30 in the X-axis, provision of the independent spindle compensating servo motor and quill arrangement for axial adjustment of one of the spindles allows effective independent control of the respective positions of lower slide 25 and upper slide 30 along the Z-axis as a result of controlling the axial positions of spindles 76 and 77 relative to each other. Consequently, as illustrated by this simplified schematic illustration, a machine tool made in accordance herewith includes a built-in compensating arrangement for both axes of orientation, and provides effective independent process control for the location of each spindle and tool being utilized.

Figure 2:
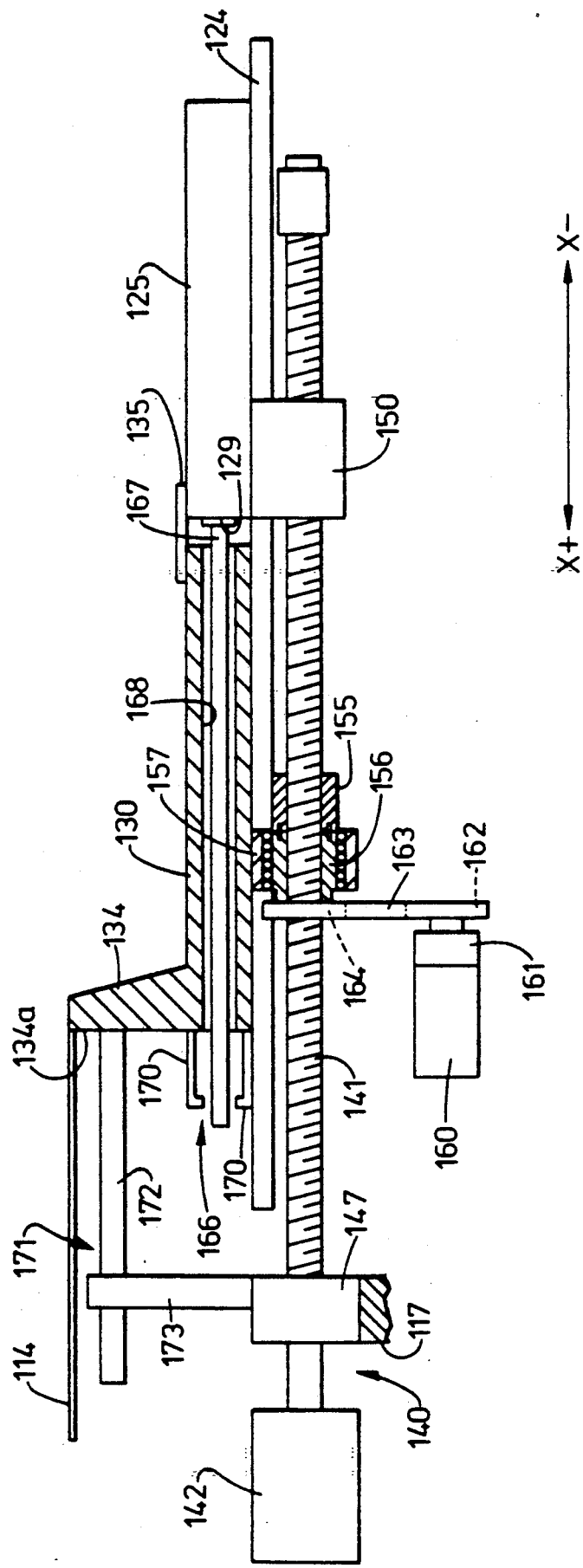
FIG. 2 is a schematic representation of a preferred slide compensation arrangement for use in the high production machining device of the subject invention.

FIG. 2 illustrates a simplified, partially cross-sectioned, schematic side elevational view of a preferred arrangement for monitoring the relative positions of a lower slide 125 and upper slide 130 in a machining device made in accordance herewith. Specifically, upper slide 130 is shown as being mounted above lower slide 125, and having an upper flange 134. Upper slide 130 is further shown with a preferred overlapping portion or seal 135 which is contemplated as spanning the gap between the slides to prevent dust, shavings or other materials from building up therebetween in use. Slide drive means 140 is illustrated as including slide drive screw 141 rotatably mounted in thrust bearings 147 for rotation about an axis parallel to the X-axis. Drive screw 141 is driven by X-axis servo motor 142. As shown, servo motor 142 can be linked directly to drive screw 141, or can drive the screw through a drive train (i.e. pulley 44, belt 45, pulley 46) as described above with respect to FIG. 1.

Lower slide ballscrew nut 150 is non-rotatably attached to the lower surface of first slide 125, and upper slide ballscrew nut 155 is rotatably attached to a second slide 130 via rotatable sleeve 156 and attachment bracket 157. An independent compensating servo motor 160 is connected as described above to compensating drive gear/pulley 164, which is integrally attached to ballscrew nut 155 through rotatable sleeve 156. While independent compensating servo motor 160 is schematically shown below upper slide 130, it is preferred that servo motor 160 be mounted somewhere on surface 134a of upper flange 134, for linear movement along the X-axis with upper slide 130. It will be understood that if identical movement of both lower slide 125 and upper slide 130 along the X-axis is desired, compensating servo motor 160 will not be activated and ballscrew nut 155 will perform as if non-rotatably attached to slide 130. Similarly, it can be seen that rotational movement of independent compensating servo motor 160 can be implemented independently of or in combination with rotation of slide drive screw 141 to enhance, minimize, or nullify linear movement which would otherwise be imposed on upper slide 130 by rotation of drive screw 141. In this way, slides 25 and 30 can be effectively independently adjusted in the X-axis direction by appropriate commands to X-axis servo motor 142 and/or independent servo motor 160.

Control of servo motors 142 and 160 will be accomplished by a properly set up control system such as a numerical control for automatically controlling machining operations in the lathe machine. However, in order to best control the positions of first slide 125 and second slide 130 along the X-axis, the relative positions of both slides must be accurately monitored. In this regard, it is contemplated that a conventional digital linear feedback scale system 171 can be utilized to monitor the X-axis position of upper slide 130. As commonly available in the industry, an etched glass slide 172 can be attached to a reference surface such as 134a of upper slide 130, and an optical reading head 173 can be utilized to provide a linear position signal to the machine's control unit. Feedback device 171 can be used not only to monitor and check to make sure that linear movement commands are properly executed, but can also detect linear growth which may result from part expansion due to varying temperatures in use. Such linear growth may be the result of expansion of drive screw 141 or other parts resulting from exposure to thermal changes. Positional errors can then be corrected by an algorithm in the control program which sends a signal to the compensating servo motor 160.

The relative position of first side 125 must also be monitored, but its position cannot easily be monitored by a conventional glass linear feedback device due to the hostile environment in which such device must be located. As seen in the schematic view of FIG. 2, located above upper flange 134, the glass linear feedback device 171 can be effectively isolated from the dust, grit, machine oil and other unfriendly aspects of the machine tool operating environment, such as by cover member 114. Such isolation is not feasible with respect to the lower slide 125. Consequently, it is preferred to utilize a monitoring arrangement 166 which will be substantially uneffected by thermal extremes and the other hostile aspects within a machine tool. FIG. 2 illustrates the attachment of a thermally inert rod 167 (e.g. a rod of material such as In-var ™ commonly available in the industry, such as Ryerson Steel of Cincinnati, Ohio; In-var ™ has a coefficient of linear expansion of only 0.000001 per unit length per ° C.) at reference surface 129 and extending through a longitudinal bore 168 in upper slide 130 for monitoring by a digital linear feedback scale 170 above upper flange 134. By calibrating linear feedback scale 170 appropriately, reference surface 134a can, in effect, become a common reference surface for monitoring the position of both lower slide 125 and upper slide 130 along the X-axis. Because rod 167 has a negligible coefficient of thermal expansion, it is substantially uneffected by temperature changes in the machine and can accurately reflect linear movements of lower slide 125. Again, information gathered by feedback scale 170 can be used to ensure that linear correction commands for moving lower slide 125 are properly carried out, and will detect any resultant linear movement along the X-axis such as caused by expansion or contraction of the machine due to thermal exposure. It should be noted that the means for monitoring the relative positions of lower slide 125 and upper slide 130 along the X-axis can comprise other combinations of monitoring structures, such as linear variable differential transformers or other conventional position error feedback devices available in the industry.

As illustrated in FIG. 1, it is further contemplated that a retractable tool probe or measuring device 200 can be utilized to monitor the relative positions of critical surfaces of tools (e.g. tools 32 and 27, respectively) for ensuring that machine tools maintain their proper respective positions in use. Probe 200 can be of a variety of constructions known in the industry, and is illustrated as including a probe sensor 202 at the distal end of its extensible arm 203, and as being mounted in a protective probe compartment 201 in which it will remain during normal operation of the machining device. Tool position information determined by probe 200 is fed into the appropriate machine control program, wherein an appropriate algorithm will sum any measured errors and apply any necessary corrections via the compensating system described herein. Final part size is best controlled by off-line measuring of cut parts produced by each spindle, and then appropriately compensating X and Z tool positions on the upper and lower slides for the upper and lower spindles, respectively, as described herein.

FIG. 3 illustrates a preferred embodiment of a machine tool incorporating the features of the present invention as described herein. In particular, a twin-spindle lathe 110 is illustrated as including a frame 111 having an inclined bed 112 and a pair of spaced bed ways 113 oriented on bed 112 parallel to transverse axis Z. Carriage 117 is slidably mounted on bed ways 113 for linear movement along the Z axis. Carriage drive means 120 is shown as including drive screw 121, servo motor 122 and thrust bearings 123, as generally described above. Similarly, a pair of spaced carriage ways 124 are provided on the upper surface of carriage 117, oriented normal to the Z axis along the X-axis.

Lower or first slide 125 and upper or second slide 130 are mounted for independent linear movement along ways 124 in a direction normal to the Z axis (i.e. parallel to the X axis), with slides 125 and 130 being driven by slide drive means 140 and independent compensating servo motor 160 as described above. FIG. 3 illustrates the preferred attachment of compensating servo motor 160 to the upper surface 134a of flange 134. It will be understood that the independent control of lower slide 125 and upper slide 130 for movement along the X-axis, as described above, correspondingly provides for independent control of the positioning of tools 127 and 132, respectively.

Figure 4:
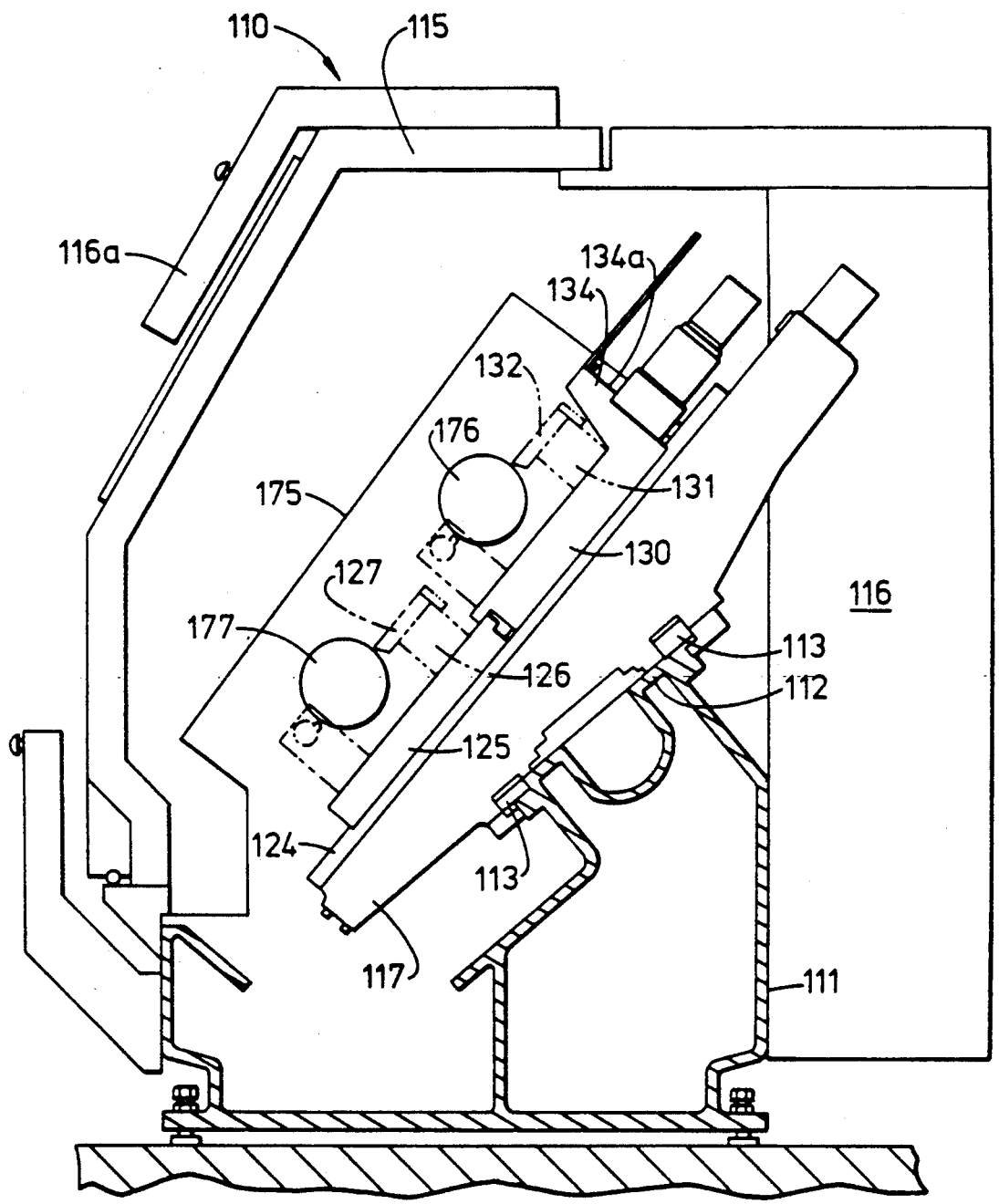
FIG. 4 is a right end view of the machining device of FIG. 3 with portions of the base cut away for clarity.

FIG. 4 shows a right end view of machine tool 110 with the drive motors and drive apparatus removed. It is believed that this view provides a better understanding of the interaction between the slides 125 and 130 with carriage 117 and spindles 176 and 177. As seen best in FIG. 4, it is anticipated that the entire machine tool will be substantially enclosed within a conventional housing 115, with the controls being preferably separately housed in control unit 116 with a front mounted operator's pendant (e.g. 116a).

Figure 5:
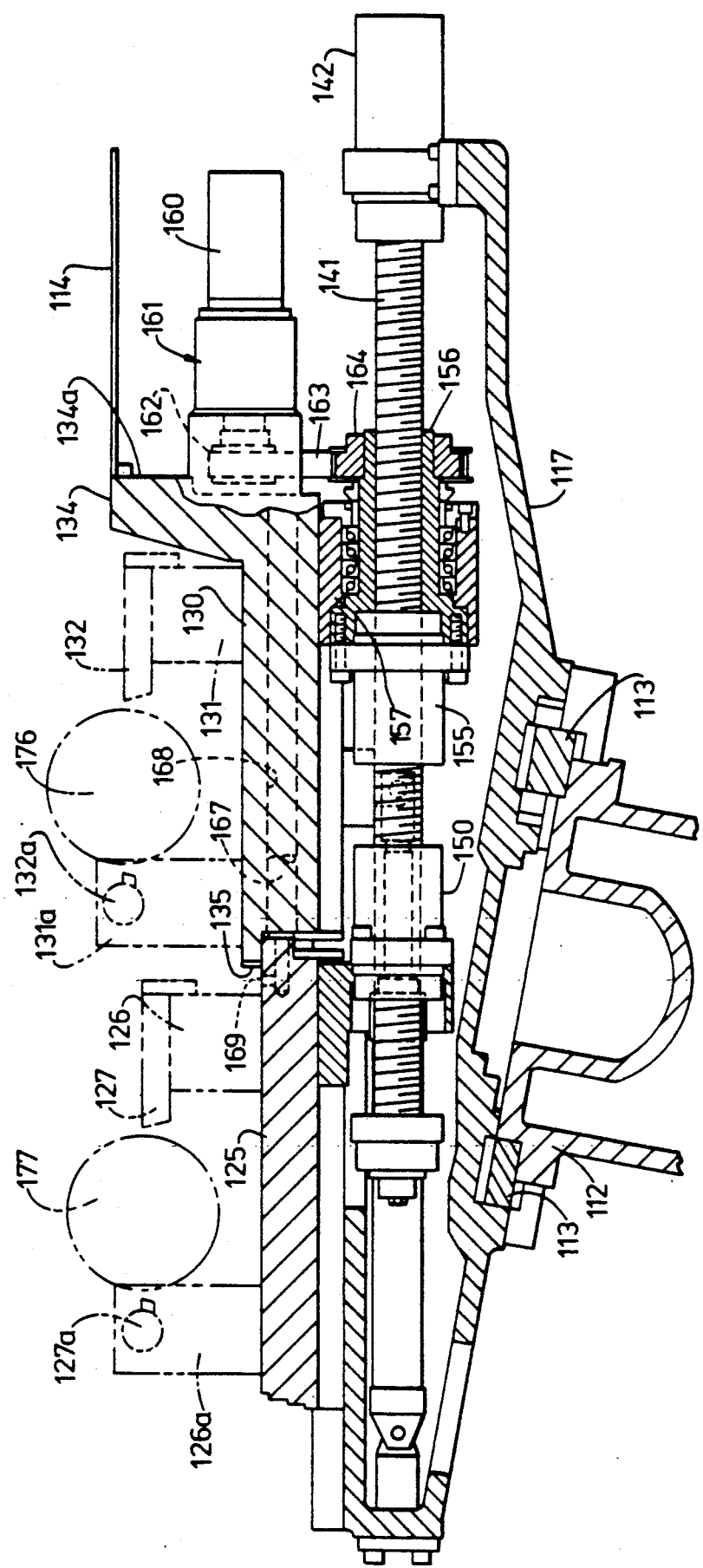
FIG. 5 is a partial cross-sectional view of a portion of the high production machining device of FIG. 3, showing specifically the carriage and cross-slides thereof.

Turning to FIG. 5, a detailed cross-sectional view of the carriage and slide portions of machine tool 110 is set forth. Again, FIG. 5 illustrates the preferred mounting of independent compensating servo motor 160 above upper flange 134 for movement with upper slide 130. It can also be seen that cover member 114 can help isolate the drive system components as well as the linear feedback devices, as described above, from the relatively hostile environment near the interface of the spindles and the cutting tools. It is contemplated that rod 167 is preferably attached to lower slide 125 by a threaded tenon and set screw 169. The slidable, overlapping arrangement of upper slide 130 with lower slide 125, along with sliding seal 135, preferably prevents foreign matter (e.g. shavings, dust, etc.) from building up between the slides in use. FIG. 5 also illustrates conventional mounting arrangements for tooling blocks 126 and 131 and their respective tools 127 and 132. As also illustrated, gang tooling arrangements can be utilized wherein additional tooling blocks (i.e. 126a and 131a) can be provided to support additional tools (e.g. 127a and 132a). Turret mountings might also be implemental to provide for gang tooling capabilities.

Figure 6:
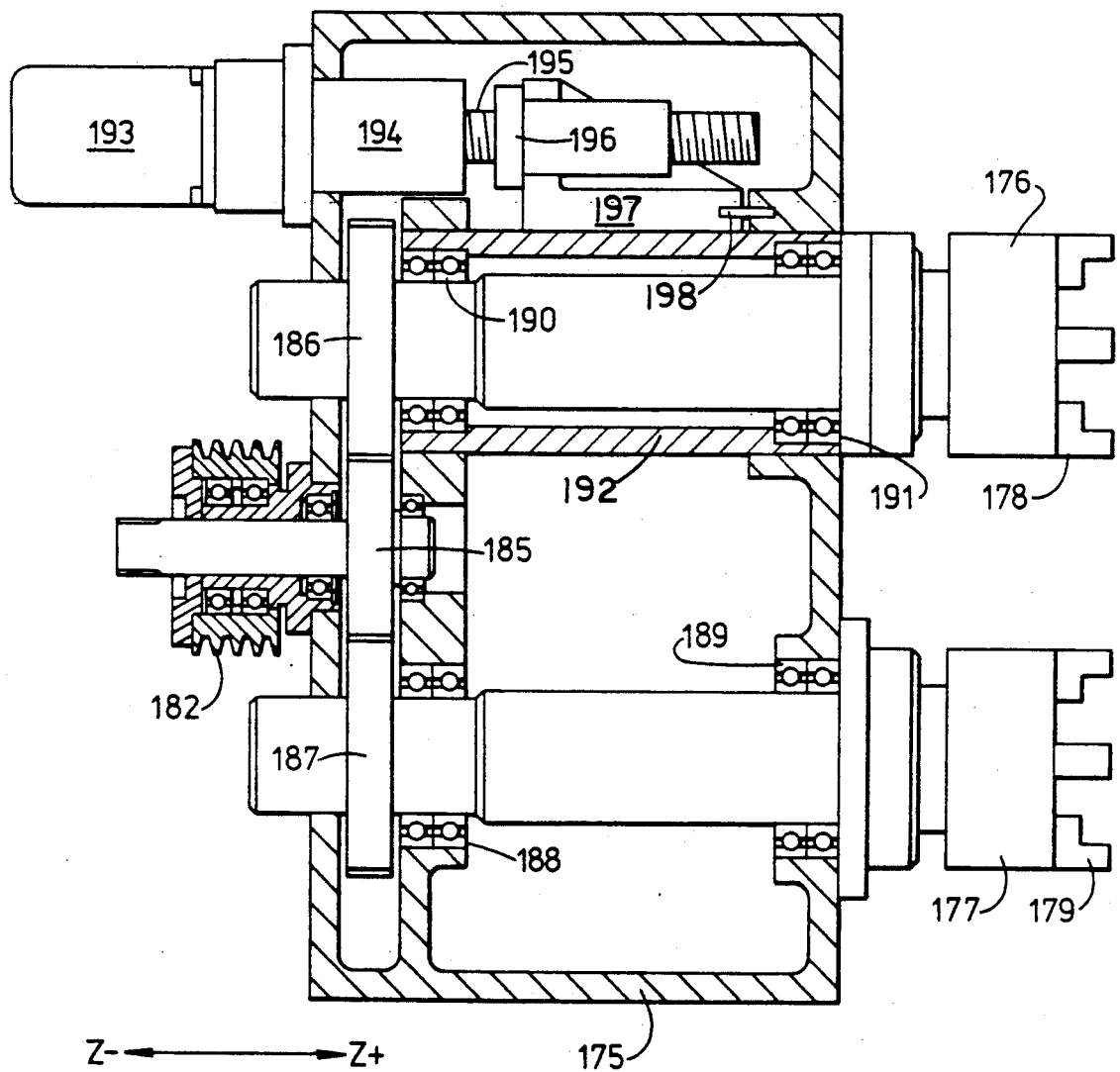
FIG. 6 is a cross-sectional view of the headstock portion of the machining device of FIG. 3.

As seen best in FIGS. 3 and 6, headstock 175 preferably includes the driven spindle motor pulley 182 journaled for rotation relative headstock 175, and connected to drive gear 185. Drive gear 185 is, in turn, in working connection with gears 187 and 186, respectively. Gear 187 drives spindle 177 which is journaled for rotation within bearings 188 and 189. Gear 186 drives spindle 176 which is journaled for rotation within bearings 190 and 191 and quill 192. As mentioned above, quill 192 is utilized to enable spindle 176 to be axially adjusted in a direction parallel to the Z-axis. Linear adjustment of spindle 176 is provided by independent spindle compensating servo motor 193 which rotates drive screw 195 through a harmonic drive 194 (e.g. 160/1). Drive screw 195 interacts with spindle compensating nut 196 to convert rotational input into linear movement which is directly imparted to quill 192 through attachment flange 197. It can be seen that in conjunction with carriage drive means 120, axial adjustment of spindle 176 provides independent control over the relative positions of spindles 176 and 177 and the tools (e.g. 127 and 132) supported on the first slide 125 and second slide 130, respectively.

A digital linear feedback scale 198 is illustrated in FIG. 6 as means for monitoring the linear position of spindle 176. Feedback scale 198 can comprise a standard linear variable differential transformer (LVDT) as commonly available in the industry, but preferably is of the digital linear variety (such as available from Heidenhain Corporation of Elk Grove Village, Ill.). LVDT devices require additional control apparatus to transform the analog signal into a linear digital signal, and it is preferred to minimize unnecessary control interfaces in the system overall.

It should be understood that the compensation systems described herein are built directly and integrally into the conventional drive systems of the machine tool. Consequently, the independent control of positioning along both the transverse Z-axis and the perpendicular X-axis are inherently reliable and available for use as desired in any given application. It should also be emphasized that the independent process control for each spindle obviates a need for qualifying sets of tools to ensure their substantial identity in dimensions. In particular, when the machine is first set up, assignable offsets inherent in the machine are determined in the conventional manner of off-line gauging of finished parts. Once appropriate offset values are assigned and the control program is checked out, assignable offsets need not be changed in the present system when tools are later replaced. When new tools are necessary, fixed offsets needed to make the substituted tools "look the same" can be measured by the retractable probe, mentioned above. The probe can be used to gauge the critical tool surfaces and relay error information to the control program.

An appropriate algorithm within the control program utilizes this error information to determine corrections which can be implemented automatically through the compensating system of the subject invention. Finally, wear offsets can be determined from time to time during operation of the machine by measuring cut parts in an off-line process, and/or by utilizing the retractable probe to gauge the tools. When new tools are substituted, the wear offsets in the control program need merely be set to zero. The algorithm within the control program simply algebraically sums the various offsets determined by the operator, the probe, and/or by the various feedback scales and devices employed, and the result is appropriately added to or subtracted from the appropriate command in the control program. Some automatic control programs (e.g. the "850" program available from Cincinnati Milacron, Cincinnati, Ohio) include three separate registers for keeping track of fixed, assignable, and wear offsets. These separate registers can conveniently be utilized to store the three categories of offsets described above, for appropriate implementation by the control program.

Having shown and described the preferred embodiments of the present invention, further adaptions of the high production machining device described herein can be accomplished by appropriate modifications by one of ordinary skill in the art without departing from the scope of the present invention. Several of these potential modifications have been mentioned, and others will be apparent to those skilled in the art. For example, the independent compensation servo assembly could be attached to the lower slide rather than the upper slide, or the spindle compensating arrangement could be implemented through the lower spindle rather than the upper spindle, as desired. It is also contemplated that the present invention could be adapted for use in other multi-spindle applications by those skilled in the art. Accordingly, the scope of the present invention should be considered in terms of the following claims and is understood not to be limited to the details of structure and operation shown and described in the specification and drawings.

I claim:

1. A high production machining device comprising:
   a headstock;
   first and second spindles rotatably mounted on said headstock;
   a carriage;
   first drive means for sliding said carriage along a transverse axis of said machining device;
   first and second slides slidably mounted on said carriage for movement in a direction normal to said transverse axis, said first and second slides each adapted to carry a machine tool and each being independently and directly connected to a common second drive means for moving said slides on said carriage;
   means for monitoring the positions of said first and second slides along said normal direction; and
   independent compensating means for adjusting the position of one of said slides relative the other slide in said normal direction, whereby the positions of said first and second slides in said normal direction can be effectively independently controlled.

2. The machining device of claim 1 wherein said independent compensating means is directly and integrally connected to said second drive means.

3. The machining device of claim 1, wherein said second drive means comprises a rotatable screw driven by a servo motor, said first and second slides being connected to and driven by said screw via first and second nuts, respectively.

4. The machining device of claim 1, further comprising independent adjustment means for moving one of said first and second spindles in an axial direction parallel to said transverse axis, whereby the positions of said first and second slides in the transverse direction can be effectively independently controlled.

5. The machining device of claim 4, wherein said independent adjustment means further comprises a servo motor, a rotatable screw, and a nut for adjusting the axial position of one of said first and second spindles relative the other spindle.

6. The machining device of claim 4, further comprising means for monitoring the axial positions of said first and second spindles along said transverse axis.

7. A high production machining device comprising:
a headstock;
first and second spindles rotatably mounted on said headstock;
a carriage;
first drive means for sliding said carriage along a transverse axis of said machining device;
first and second slides slidably mounted on said carriage for movement in a direction normal to said carriage for movement in a direction normal to said transverse axis, said first and second slides each adapted to carry a machine tool and attached to a common second drive means for moving said slides, said second drive means comprising a rotatable screw driven by a servo motor, said first and second slides being driven by said screw via first and second nuts, respectively;
means for monitoring the positions of said first and second slides along said normal direction; and
independent compensating means for adjusting the position of one of said slides relative the other slide in said normal direction, said independent compensating means being integrally connected to said second nut, said second nut being rotatably mounted on said rotatable screw and rotatably attached to said second slide, whereby said second nut can be rotated relative said rotatable screw by said independent compensating means, and whereby the position of said second slide in said normal direction is determined by the combined rotational input on said second nut by said screw and said independent compensating means such that the positions of said first and second slides in said normal direction can be effectively independently controlled.

8. A high production machining device comprising:
a headstock rotatably supporting a first spindle and a second spindle, said first and second spindles mounted in axially parallel relationship;
a carriage;
first drive means for selectively sliding said carriage along a transverse axis of said machining device, said transverse axis being substantially parallel to said axially parallel spindles;
first and second slides slidably mounted on said carriage for movement along an axis normal to said transverse axis, said first and second slides each adapted to carry a machine tool;
second drive means for selectively moving said first and second slides along said normal axis;
means for monitoring the positions of said first and second slides along said normal axis;
independent compensating means for changing the position of one of said first and second slides along said normal axis relative the other slide, whereby the combination of said second drive means and said independent compensating means provides effective independent control of the respective positions of said first and second slides along said normal axis; and
independent adjustment means for changing the axial position of one of said first and second spindles along said transverse axis relative the other spindle, whereby the relative positions of said first and second spindles in a direction parallel to said transverse axis can be effectively independently controlled.

9. The machining device of claim 8, wherein said independent compensating means is integrally connected to said second drive means.

10. The machining device of claim 8, wherein said second drive means comprises a rotatable screw, and first and second nuts attached to said first and second slides, respectively.

11. The machining device of claim 8, further comprising means for monitoring the axial positions of said first and second spindles along said transverse axis.

12. A high production machining device comprising:
a headstock rotatably supporting a first spindle and a second spindle, said first and second spindles mounted in axially parallel relationship;
a carriage;
first drive means for selectively sliding said carriage along a transverse axis of said machining device, said transverse axis being substantially parallel to said axially parallel spindles;
first and second slides slidably mounted on said carriage for movement along an axis normal to said transverse axis, said first and second slides each adapted to carry a machine tool;
second drive means for selectively moving said first and second slides along said normal axis, said second drive means comprising a rotatable screw, and first and second nuts attached to said first and second slides, respectively;
means for monitoring the positions of said first and second slides along said normal axis;
independent compensating means for changing the position of one of said first and second slides along said normal axis relative the other slide, wherein said independent compensating means is integrally connected to said one said second nut, said second nut being rotatably mounted on said rotatable screw and rotatably attached to said second slide, whereby said second nut can be rotated relative said rotatable screw by said independent compensating means, and whereby the position of said second slide in said normal direction is determined by the combined rotational input on said second nut by said screw and said independent compensating means such that the combination of said second drive means and said independent compensating means provides effective independent control of the respective positions of said first and second slides along said normal axis; and independent adjustment means for changing the axial position of one of said first and second spindles along said transverse axis relative the other spindle, whereby the relative positions of said first and second spindles in a direction parallel to said transverse axis can be effectively independently controlled.

13. A high production two-spindle, two-axis machining device comprising:

a headstock rotatably supporting a first spindle and a second spindle, said first and second spindles mounted axially parallel to one another and to a transverse axis of said machining device, and one of said first and second spindles being axially adjustable in a direction parallel to said transverse axis;

a carriage slidably mounted relative said headstock along said transverse axis;

first drive means for selectively sliding said carriage along said transverse axis;

first and second slides slidably mounted on said carriage for movement along an axis normal to said transverse axis, said first and second slides each adapted to carry a machine tool;

second drive means for selectively moving said first and second slides along said normal axis, said second drive means comprising a rotatable screw and first and second nuts connected to said first and second slides, respectively;

means for monitoring the positions of said first and second slides relative one another along said normal axis;

independent compensating means for changing the position of one of said first and second slides along said normal axis relative the other slide, said independent compensating means connected to said one of said first and second slides via the nut thereof, whereby the combination of said second drive means and said independent compensating means provides effective independent control of the respective positions of said first and second slides along said normal axis;

independent adjustment means for changing the axial position of one of said first and second spindles along said transverse axis relative the other spindle, whereby the relative positions of said first and second spindles in a direction parallel to said transverse axis can be effectively independently controlled; and detection means for monitoring the relative axial positions of said first and second spindles along said transverse axis.

14. The machining device of claim 13, wherein said independent compensating means comprises a servo motor which is connected to said second slide through said second nut, said second nut being rotatably attached to said second slide such that resultant sliding movement of said second slide is determined by the combined effects of any rotation of said second nut by said independent compensating servo motor and any rotation of said rotatable screw.

15. The machining device of claim 13, further comprising a machine control program for automatically implementing programmed position movement of said carriage, slides, and spindles, and for receiving position error signals and implementing appropriate compensating adjustments through said independent compensating and adjustment means.

16. The machining device of claim 15, further comprising a probe for automatically measuring relative positions of critical surfaces of machine tools carried by said first and second slides, and wherein said machine control program can receive position signals from said probe for determining whether compensating adjustments are needed.

17. The machining device of claim 13, wherein said independent adjustment means comprises an adjustment servo motor, a spindle adjustment screw, and a spindle nut attached to a quill within which said one of said first and second spindles is rotatably mounted, whereby energization of the adjustment servo axially moves said one spindle in a direction parallel to said transverse axis.

18. The machining device of claim 13, wherein said means for monitoring the positions of said slides along the normal axis comprises an assembly including a linear scale attached to a reference surface of one of said slides, and a digital linear feedback device which remotely monitors the position of said one of the slides by detecting position changes of said scale.

19. The machining device of claim 18, wherein said linear scale comprises a length of material with a very low coefficient of thermal expansion attached to said reference surface of one of said slides, and wherein said digital linear feedback device is mounted adjacent a second reference surface of the other of said slides, said second reference surface being substantially isolated from the hostile environment of the machining device.

20. The machining device of claim 19, wherein said means for monitoring further comprises a second digital linear scale and feedback assembly for measuring linear movement of said second reference surface of the other of said slides along the normal axis, whereby the relative positions of said first and second slides can be determined by comparison of data from the two digital linear feedback assemblies.

* * * * *